July 8, 1924.  
J. E. TATE  
BOLL WEEVIL DESTROYER  
Filed Nov. 14, 1921  
1,500,162
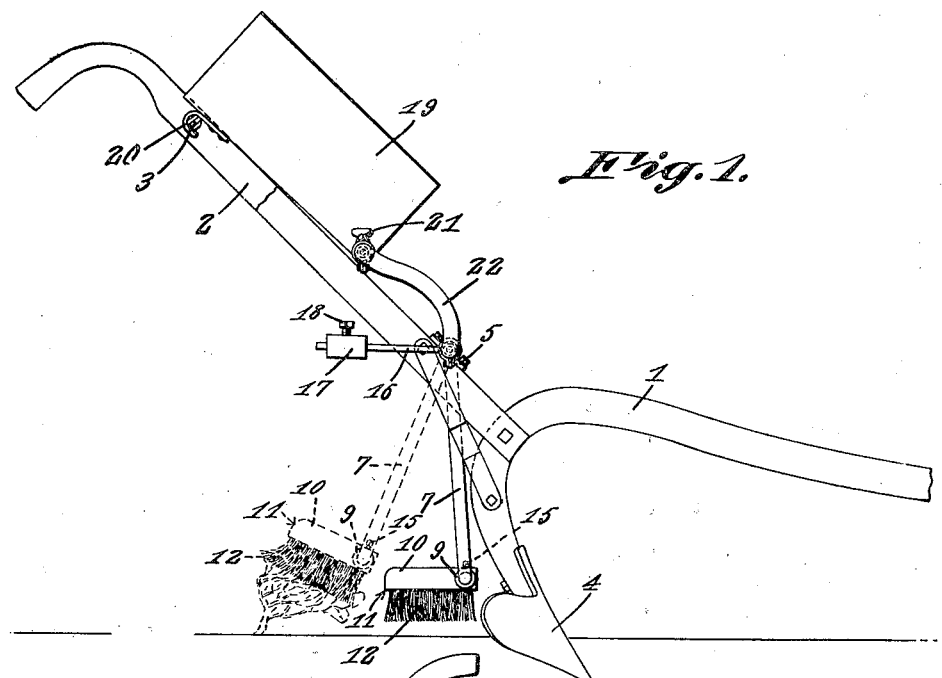
Fig. 1.
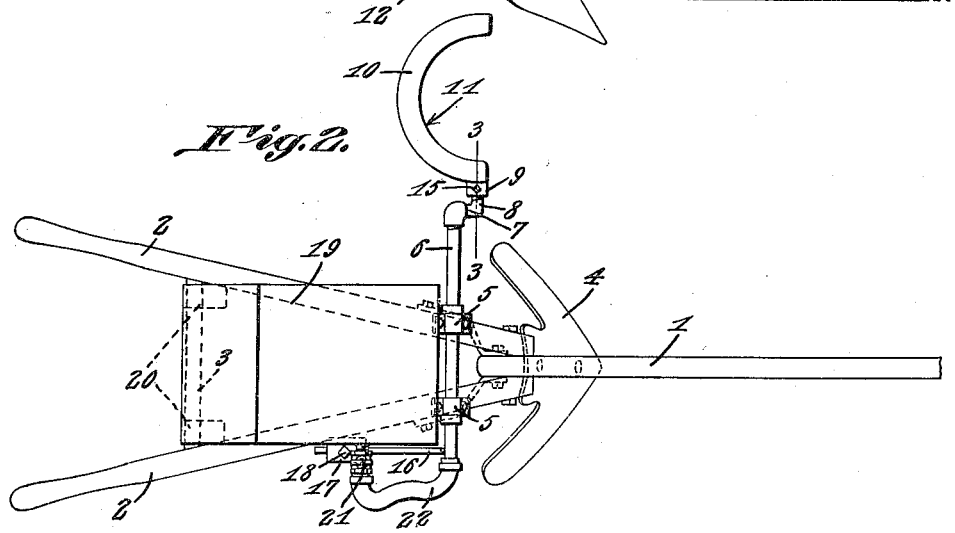
Fig. 2.
Fig. 3.
J. E. Tate, Inventor Patented July 8, 1924.

1,500,162

UNITED STATES PATENT OFFICE.

JAMES E. TATE, OF ELBERTON, GEORGIA.

BOLL-WEEVIL DESTROYER.

Application filed November 14, 1921. Serial No. 515,081.

*To all whom it may concern:*

Be it known that I, JAMES E. TATE, a citizen of the United States, residing at Elberton, in the county of Elbert and State of Georgia, have invented a new and useful Boll-Weevil Destroyer, of which the following is a specification.

It is the object of this invention to provide a simple means, adapted to be mounted on a plow, for the destruction of boll weevils, the construction being such that the spraying or destroying operation may be carried on simultaneously with the cultivation of the crop, time being saved, accordingly. Another object of the invention is to provide novel means for mounting the spraying member for swinging movement in a vertical plane, responsive to contact with the standing crop, the spraying member being so shaped that it will extend part way around a cotton plant, and apply an insecticide to the under side of the leaves.

It is within the province of the disclosure to improve generally and to enhance the utility of devices of that type to which the invention appertains.

I do not bind myself to the specific form delineated and described, since, within the scope of what is claimed, a mechanic may make changes in the form selected as a material embodiment of the invention, without departing from the spirit or avoiding the charge of infringement.

In the drawings:—Figure 1 shows in elevation, a plow carrying the device forming the subject matter of this application; Figure 2 is a top plan; and Figure 3 is a section on the line 3—3 of Figure 1.

The numeral 1 denotes a plow of any desired construction, comprising a soil-engaging member 4 and handles 2, the handles being connected by a rung 3. Bearings 5 are mounted on the handle 2, and in the bearings, a shaft 6 is journaled for rocking movement, the shaft preferably being in the form of a length of pipe, having a depending arm 7 provided with an outstanding end 8 received in a socket 9 formed on the hollow head 10 of an applying member 11, the head carrying depending bristles 12, although the applying member may be of any desired form which is effective to spray an insecticide on the standing crop. The head 10 has any desired number of openings 14, as shown in Figure 3, for the passage of the insecticide from the hollow head to the bristles 12. The end 8 of the arm 7 is held in the socket 9 by a set screw 15. The applying member 11 is so shaped in top plan that it will extend around three sides of the standing cotton plant. The shaft 6 has a rearwardly extended arm 16 whereon a weight 17, shown best in Figure 1, is adjustable, longitudinally of the arm, the weight being held in adjusted position by a set screw 18.

A tank 19 rests removably on the handles 2 of the plow, and is provided with hooks 20 adapted to engage the rung 3. A valve 21 is mounted on one side of the tank 19 and is connected to a flexible tube 22, the tube 22 being connected to one end of the shaft or pipe 6.

In practical operation, a liquid insecticide, contained in the tank 19, flows, under the control of the valve 21 through the tube 22, through the shaft 6, through the arm 7 of the shaft and through the part 8, into the head 10 of the applying member 11, and, thence, through the openings 14, to the bristles 12. As the plow 1 moves forwardly, the standing plant is received by the curved applying member 11 and said member swings rearwardly, into the dotted line position shown in Figure 1, the bristles 12 being drawn over the plant, and the insecticide being applied to the plant on at least three sides thereof. As the plant is traversed by the applying member, the insecticide is applied to the under surface of the leaves, it being a matter of common knowledge that the boll weevils lurk beneath the leaves and on the under surface thereof.

It is to be observed that a means is provided whereby the pressure exerted against the plants, by the applying member 11, may be adjusted, this adjustment being brought about by shifting the weight 17 along the arm 16, the weight being held in any position to which it may have been shifted by tightening the set screw 18 which is carried by the weight.

The invention proposes a simple but efficient means whereby an insecticide may be applied to a cotton crop, simultaneously with the cultivation thereof, the applying member being yieldably mounted so that it may swing during the application of the insecticide to the crop, thereby avoiding injury to the plants. The insecticide is applied around three sides of the plant and to the under surface of the leaves, it being possible, as hereinbefore explained, to adjust the pressure with which the applying member bears against the plant.

I claim:—

1. In a device of the class described, a support; a shaft mounted to rock on the support and having a depending arm; an applying member carried by the arm and adapted to engage a standing plant; and means for adjusting the pressure with which the applying member bears against the standing plant.

2. In a device of the class described, a support; a shaft mounted to rock on the support and provided with arms, one of which is a depending arm; an applying member carried by the depending arm; and a weight mounted on the other arm, the weight constituting means for varying the pressure with which the applying member bears against a standing plant.

3. In a device of the class described, a support; a shaft mounted to rock on the support and provided with arms, one of which is a depending arm; an applying member carried by the depending arm; and adjustable means cooperating with the other arm for regulating the pressure with which the applying member bears against a standing plant.

4. In a device of the class described, a support; a shaft mounted to rock on the support and provided with arms, one of which is a depending arm; an applying member carried by the depending arm; a weight adjustable along the other arm and constituting means for regulating the pressure with which the applying member bears against a standing plant; and means for holding the weight in adjusted position upon the arm whereby it is carried.

5. In a device of the class described, a support including an inclined handle, a bearing on the handle, a hollow shaft journaled in the bearing and having a rigid depending hollow arm communicating therewith, an applying member at the lower end of the arm, and the arm discharging into the applying member, a tank supported on the handle, interengaging elements on the tank and on the handle for retaining the tank removably on the handle, and a tubular connection between the tank and the shaft, the connection being flexible to permit said elements to be interengaged and disengaged.

In testimony that I claim the foregoing as my own, I have hereto affixed my signature in the presence of two witnesses.

JAMES E. TATE.

Witnesses:
IVY E. SIMPSON,
MASON B. LAWTON.